United States Patent [19]
DiPaola

[11] Patent Number: 5,084,997
[45] Date of Patent: Feb. 4, 1992

[54] FISHING LURE AND METHOD

[76] Inventor: Frank A. DiPaola, 4231 Bluebird, Union Lake, Mich. 48085

[21] Appl. No.: 494,169

[22] Filed: Mar. 15, 1990

[51] Int. Cl.⁵ ............................................. A01K 85/00
[52] U.S. Cl. .................... 43/42.53; 43/42.25; 43/42.24
[58] Field of Search ............... 43/42, 42.24, 42.53, 43/42.09, 42.25

[56] References Cited

U.S. PATENT DOCUMENTS

| | | |
|---|---|---|
| 341,331 | 5/1886 | Holberton . |
| 1,388,156 | 8/1921 | Allen . |
| 1,523,895 | 1/1925 | Pott . |
| 1,949,582 | 3/1934 | Pott ..................... 43/42.25 |
| 2,034,832 | 3/1936 | Raycraft . |
| 2,043,609 | 6/1936 | Perry ..................... 43/42.25 |
| 2,082,305 | 6/1937 | Strong ..................... 43/42.25 |
| 2,093,585 | 9/1937 | Woodhead ..................... 43/42.25 |
| 2,187,666 | 1/1940 | Schumann . |
| 2,231,949 | 2/1941 | Rinehart . |
| 2,467,640 | 4/1949 | Turner . |
| 2,533,523 | 12/1950 | Swey ..................... 43/42.53 |
| 2,591,391 | 4/1952 | Walsh . |
| 2,865,130 | 12/1958 | Accetta ..................... 43/42.24 |
| 3,079,722 | 3/1963 | Greenlee . |
| 3,461,598 | 8/1969 | Brewster . |
| 3,690,028 | 9/1972 | Walker, Jr. . |
| 3,690,029 | 9/1972 | Pobst . |
| 3,864,864 | 2/1975 | Duescher . |
| 4,158,927 | 6/1979 | Capra et al. . |
| 4,411,089 | 10/1983 | Runeric . |
| 4,559,736 | 12/1985 | Sienkiewicz . |
| 4,712,325 | 12/1987 | Smith . |
| 4,773,181 | 9/1988 | Radden . |
| 4,790,101 | 12/1988 | Craddock . |
| 4,823,502 | 4/1989 | Tucker . |

FOREIGN PATENT DOCUMENTS 640556 7/1950 United Kingdom ............... 43/42.53

Primary Examiner—Kurt Rowan
Attorney, Agent, or Firm—Harness, Dickey & Pierce

[57] ABSTRACT

This invention relates to a fishing lure having a flexible body portion. The body portion has means for attaching a hook to one end and a fishing line to the other end. The body portion is formed by a flexible core element with radially extending flexible fibers from the core element. Because of the flexibility of the radially extending fibers, a "soft" body portion is formed resulting in the advantage that the fish has a tendency to keep the lure in its mouth longer. The fibers are longer at the middle of the body portion and continually get shorter towards the ends in a tapering fashion such that the body portion has a minnow-like shape. The body portion, further, has memory characteristics such that it can be shaped into various configurations and can travel through water and remain in a set configuration. When a fish strikes the lure the body portion will flex reducing the fish's mechanical advantage to help maintain the fish on the lure.

29 Claims, 2 Drawing Sheets

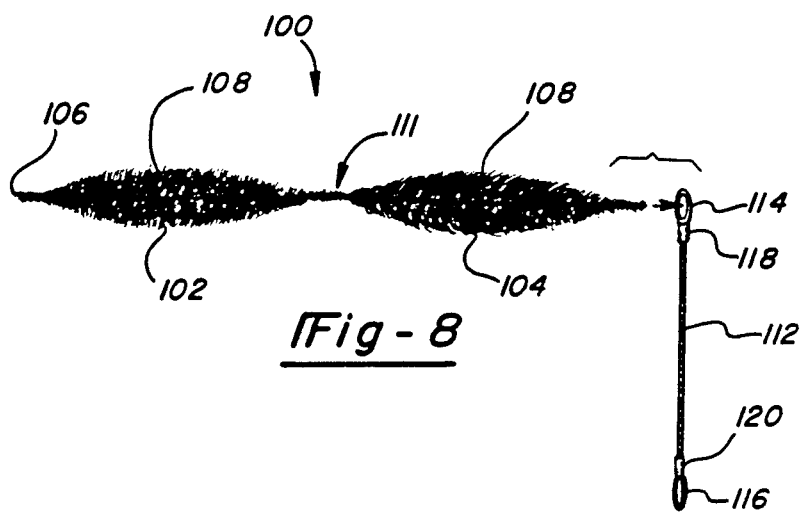
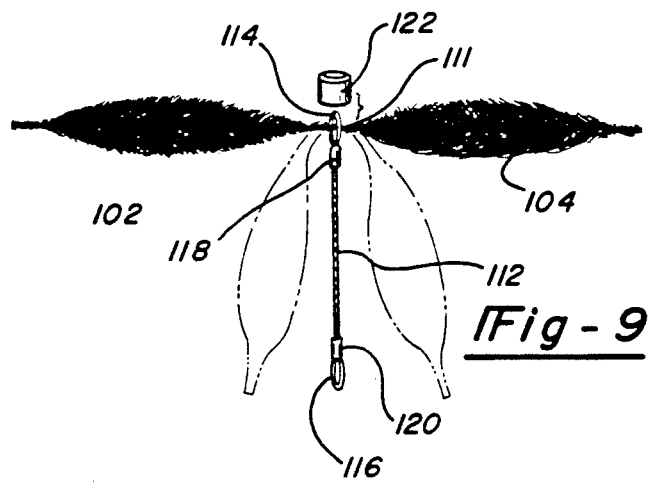
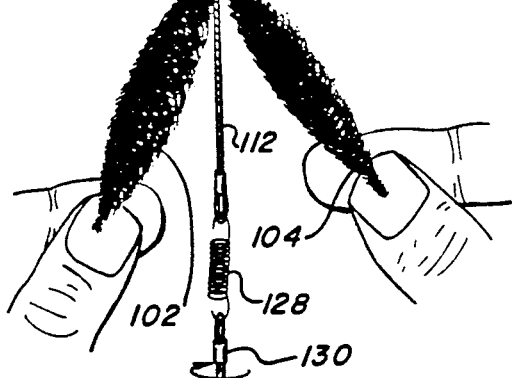
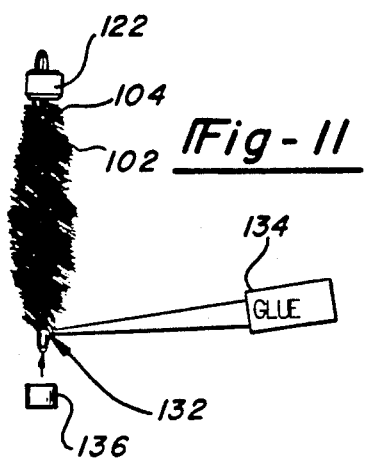

FISHING LURE AND METHOD

BACKGROUND OF THE INVENTION

The present invention relates to a fishing lure and a novel method for production of a fishing lure.

In the past it has been a goal in the art to provide fishing lures which have lifelike shapes and/or characteristics for simulating a live bait type fish or other natural creature. Thus, in furtherance of this goal many lures, such as minnow imitating hard body baits, grub lures and artificial flies, have been created to simulate living creatures for attracting and provoking a striking response for hooking of a fish. In many cases, while these lures are traveling through the water they look surprisingly lifelike. However, it has been a disadvantage in the prior art lures that once the fish has the lure in its mouth it instantly realizes that the lure is artificial because of the nonflexible and hard characteristics of the body portion of the lure. Thus, the fish's reaction is instantly to spit the lure out. At times the fish can effectively pick up and spit out the lure without the fisherman even knowing that the fish was there. Therefore, even a slight increase in the time the fish holds onto the lure may make a big difference in the number of total hook ups.

In addition, many prior art lures are not adaptable to various fishing conditions in that the lure is designed and remains in one general configuration and can not be modified without special tools or other equipment. Additionally, many prior art lures are relatively heavy and relatively stiff in their body formation such that a fish can use the weight and stiffness of the lure to its own mechanical advantage after being hooked by shaking of the lure and thereby camming the hooks of the lure out of its mouth. This is due to the weight of the lure or because the stiff body portion acts as a lever to increase the forces imposed on the hooks.

Because of the inevitability of losing lures due to snags and the like, the cost of a lure is a factor in purchase and use of a particular lure. Thus, improved methods of manufacture of inexpensive and productive lures has long been a goal in the art.

Therefore, there has been a need in the art to provide a lure which in appearance looks natural and lifelike and which from the perspective of a fish feels like a lifelike bait for a longer period of time when a fish hits the lure. Additionally, it has been a goal to provide a lure which may be easily modified or adjusted in its longitudinal shape or in body shape. The lure of the present invention provides such an advantageous configuration.

SUMMARY OF THE INVENTION

In accordance with the present invention there is provided a fishing lure including a flexible core member having a pair of terminal ends. A hook is attached to one of the terminal ends and on the other terminal end there is provided an eye or the like adapted fot attachment to a fishing line. A plurality of fibers extend radially from the flexible core member for forming a minnow shaped body portion which is widest between the terminal ends, i.e. the fibers are longer at a portion between the terminal ends and taper to the terminal ends by providing progressively short lengths of radially extending fibers. The flexible core member is flexible so that when a fish is hooked the lure body itself can not be used as a mechanical advantage to remove or shake loose the hook. Additionally, the flexible core member has memory characteristics such that it can be molded or bent into different shapes to provide a specific lure configuration peculiar to a particular situation.

In accordance with the method aspects of the present invention a lure may be advantageously produced by providing a lure body having the characteristics set forth above and attaching or forming a line attachment member at a first end and a hook at a second end.

Thus, it is an object of the present invention to provide a lure which has a lifelike appearance and feel such that when a fish hits the lure it will not realize that it is merely a lure until well after the fish is already hooked.

It is still further an object of the present invention to provide a lure which has a flexible body portion such that when the fish is hooked by the lure it can not use the lure body for its mechanical advantage in removing the lure from its mouth. It is still further an object of the present invention to provide a lure which may be easily adjusted in the field to provide different body shapes and which also may be formed with respect to its body contours to provide a more well rounded and variable lure configuration for a variety of conditions.

It is still further an object of the present invention to provide a simple and cost effective method of producing an effective fishing lure.

Additional benefits and advantages of the present invention will become apparent from the subsequent description of the preferred embodiments and the appended claims taken in conjunction with the accompanying drawings.

BRIEF DESCRIPTION OF THE DRAWINGS

FIG. 8 is a perspective view showing a step in accordance with the teachings of the method ofthe present invention;

FIG. 9 is a perspective view showing a step in accordance with the teachings of the method of the present invention;

FIG. 10 is a perspective view showing a step in accordance with the teachings of the method of the present invention; and FIG. 11 is a perspective view showing a step in accordance with the teachings of the method of the present invention.

DETAILED DESCRIPTION OF THE PREFERRED EMBODIMENTS

Figure 1:
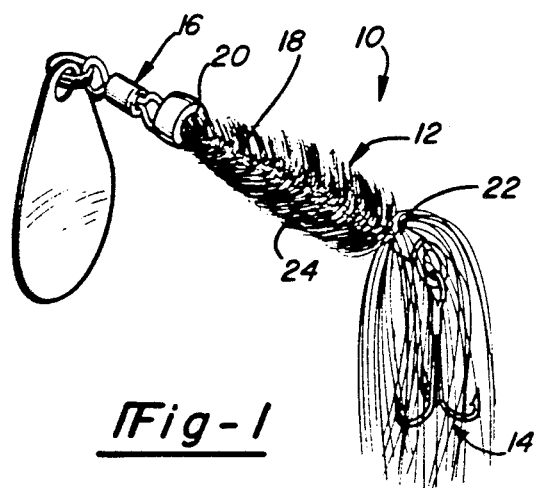
FIG. 1 is a perspective view of a fishing lure made in accordance with the teachings of the present invention.

In accordance with the present invention there is provided a fishing lure 10. Fishing lure 10 includes a body portion 12, a hook means 14 and a means 16 for attaching a line to the body portion 12. Body portion 12 includes a central elongated core member 18. The cores member 18 includes a pair of terminal ends 20 and 22. The shape of the body portion 12 is formed by a plurality of radially extending fibers 24. These fibers form a "minnow shaped" body which is wider at a portion between the terminal ends and tapers to the ends 20 and 22 by providing the longest radially extending fibers at the central portion of the body and progressively shortening the length of the radially extending fibers toward the ends 20 and 22 to provide the "minnow shape" of the lure body.

Figure 3:
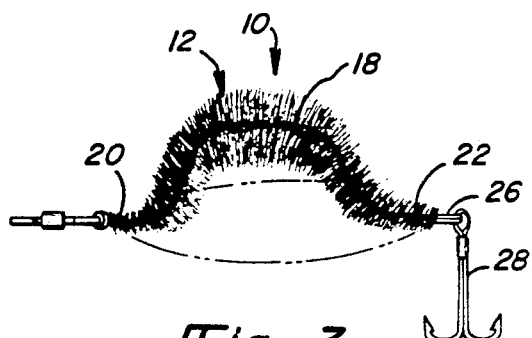
FIG. 3 is a side view of the lure of the present invention in an alternate adjusted configuration.

The core member 18 is made of a material which is relatively flexible and has memory characteristics such that it can be shaped in various shapes such as that shown in FIG. 3. Thus, the lure made in accordance with the teachings of the present invention has the capability of being shaped in a sinuous or other shape which may, for instance, simulate a wounded minnow, a leech type shape as shown in FIG. 3 or other shapes as desired by the fisherman. The core member 18 must be of such a material such that the body retains its shape during fishing conditions, however, when a fish strikes the lure the body would return to its elongated shape, such as shown in phantom in FIG. 3. The lure may thereafter be quickly reshaped by hand to the fisherman's desired configuration.

Figure 2:
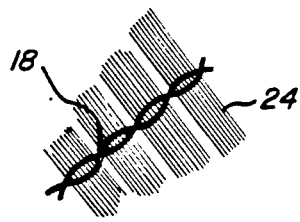
FIG. 2 is detailed perspective view showing the construction of the fiber like body portion in the lure of the present invention.

The capability of the lure body to flex or return to an elongated shaped reduces the ability of the fish to use the lure itself for quickly shaking the lure out of its mouth. A fish is able to use the leveraging capabilities of a prior art rigid lure body to effectively shake the lure out of its mouth. With the flexible lure body according to the subject invention, the mechanical advantage for the lure is greatly reduced, thus, the fish will have a harder time getting the lure out if its mouth. In a preferred embodiment the core member 18 includes a pair of wires, such as stainless steel wires or the like which are twisted together, such as shown in FIG. 2, to provide the radially extending fibers 24 for forming the body portion 12. This twisted configuration produces the further advantage in that toothy fish, such as walleyes or northern pike, may tend to get their sharp teeth entwined in the twisted wires providing extra time for the fisherman to set the hook.

In addition, with the body portion in other than a straight configuration a certain amount of play in the core member 18 is provided during striking. This allows for an increase in the amount of resultant hook setting force as follows. With the core portion of the body in a configuration which is other than straight, a certain amount of slack is created between the terminal ends. With the fishing line connected to one of the terminal ends, the slack must be drawn up during the hook set. During the hook set process the line may be moved for an instant away from the hook at a greater velocity, because of this slack, and when reaching the end of the slack the momentum of the line movement causes the net force of hook setting power to be greater. This allows for an advantageous increase in hook setting force for setting the hook in bony mounted fish, such as northern pike.

Figure 4:
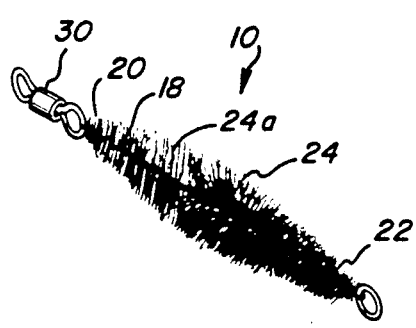
FIG. 4 is a perspective view of the fishing lure made in accordance with the teachings of the present invention showing the molding of a particular form of the body portion.
Figure 5:
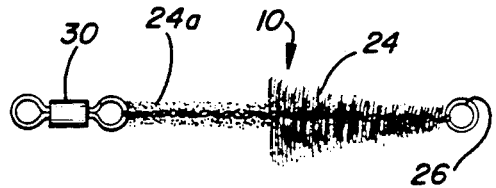
FIG. 5 is a top view showing the fishing lure of FIG. 4.

The fibers 24 which form the body portion are made of a material which can be reformed by pressure to retain a new desirable body contour. For instance, referring to FIGS. 4 and 5, a portion of the body or the whole body could be flattened or otherwise molded into a desired configuration merely by pressure to produce a flat body contour which would simulate a leech type bait, such as shown at 24a in FIGS. 4 and 5. Thus, any of a number of suitable materials can be utilized to produce the fiber portion such as different colored polymer type fibers, polypropylene, or aluminized fibers and the like which would produce suitable attractive characteristics for the particular fish species sought. An additional advantage of the fiber construction of the present invention is that the lure will appear mor lifelike due to undulation of the fibers by movement of the lure through the water. In a preferred embodiment of the present invention a polypropylene fiber material is utilized which is pressure deformable or pressure and heat deformable such that the lure shape may be easily flattened by placement of the lure under a book or the like. alternatively, if various contours, such as a head or tail are desirable, the lure body could be placed in a suitable mold and heated to cause the body to conform to the desired shape.

In a preferred embodiment of the present invention shown in FIGS. 1 through 5, a central core member 18 is the strength bearing element which is attached to split rings or the like 26, such that of hook 28 can be attached at the end 22. A snap swivel or the like 30 may be attached to the central core member 18 at the other end to provide the attachment to a fishing line.

Figure 6:
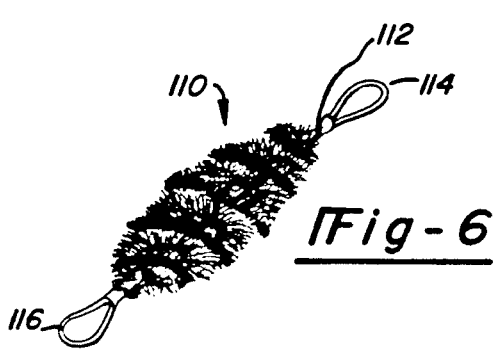
FIG. 6 is a perspective view of an alternate body of the present invention which includes a central strength bearing core element.

Referring now to FIG. 6, there is shown an alternate embodiment of the fishing lure of the present invention 110. In this embodiment of the present invention a central strength bearing element 112 is provided which has first 114 and second 116 ends. First 114 and second 116 ends include loops therein for attaching to a hook or a line.

In this embodiment of the present invention a lure body, such as that shown in FIGS. 1 through 5, may be helically wrapped around the central element 112 to provide a body configuration which is again wider at the middle and tapers to the terminal ends. Thus, the element 112 which may be a straight wire elements, coated wire leader type material or monifilament line which is suitably flexible such that the characteristics for forming and bending of the lure will not be harmed. However, the wire members which form the helically wound body portion provide for the memory characteristics which allow the lure to form various shapes by the fisherman using his finger pressure to bend same.

Figure 7:
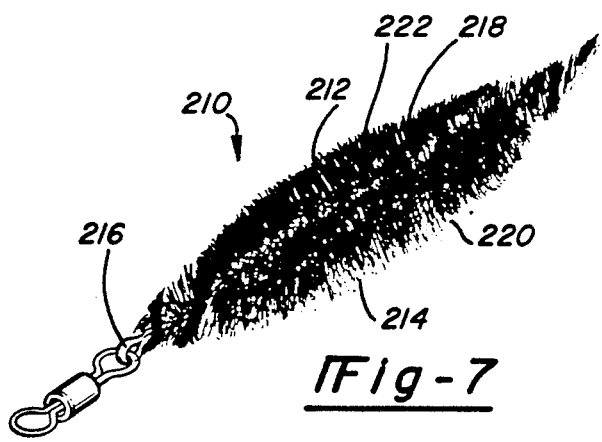
FIG. 7 is a perspective view of a further alternate embodiment of a fishing lure made in accordance with the teachings of the present invention wherein a pair of body portions ae attached to a central core member to produce a fishing lure having a different colored top portion and body portion for simulating the minnow type bait.

Referring now to FIG. 7, there is shown still an alternate embodiment of the present invention 210 which allows for a fishing lure body which has a separate color on the top portion 212 and on the bottom portion 214. This embodiment also has central strength bearing members 216 to which are attached separated body members 218 and 220. Thus, the members may be secured to the core member 216 at the middle portion 222 and may be twisted around either end and secured by means of glue or the like for providing a lure which has separate color portions on the top versus the bottom, for instance, to simulate the natural light and dark colorations of a minnow.

Referring now to FIGS. 8 through 11, there is shown a preferred method for producing a fishing lure in accordance with the teachings of the present invention. In accordance with the first step of the method a body forming member, generally shown at 100, is provided which includes a pair of body members 102 and 104 having the characteristics as set forth above in that they have a central flexible core member 106 running therethrough and outer fibers 108 for forming the shape of the body portion. The body members 102 and 104 are connected at a central portion 111 so as to be one piece. A core strength bearing element 112 is provided which includes a loop 114 at an upper end and a loop 116 at a lower end. A central core element may be that as described above such as a leader material which has crimps 118 and 120 for forming the loop members 114 and 116, respectively.

The lower body portion 100 is inserted through the loop 114 to the mid-point 111 of the body portion, as shown in FIG. 9. Thereafter, the body portions are folded down adjacent the element 112, as shown in phantom in FIG. 9. A securement bead 122 which may be secured over the loop containing the central portion 111 therethrough, may be provided to retain the body portion 100 in the position shown in phantom for wrapping of the body portion around the central strength bearing element 112.

In a third step of the present invention the bodies 102 and 104, in the folded position are helically wrapped about the strength bearing element 112 to provide a finished lure having a body portion which is wider at the middle and narrows toward the edges to provide a "minnow shaped" body. This step can be accomplished by hand such as by manually wrapping the body members 102 and 104 about the central core member 112. However, in a preferred embodiment the upper loop 114 may be attached to a rotating hook portion 124 which is operably attached to a sewing machine motor or the like 126. The opposite end is attached through a spring coupling 128 to a pivotal securement 130 to allow rotation of the core member 112 by the motor 126. In this embodiment the motor rotates the element 112 and the body portions 102 and 104 are held from rotation such that they helically wrap around the central core element 112, as shown in FIG. 11, to provide a single body portion.

Thereafter, the peripheral end, generally shown at 132, may be secured to the central core element by the likes of a lacquer, glue 134. In a preferred embodiment a rubber band 136 is utilized for providing securement to the end 132, either with or without the presence of glue. By providing different colored members 102 and 104 striped pattern can be obtained, such as shown in FIG. 11, and any number of colors desirable to the final consumer or effective in a particular fishing situation may be utilized. The added surface area of the fiber material utilized in the present invention advantageously allows for better retention of scent and also provides the forming characteristics set forth above and the soft body characteristics which are so desirable in a lure.

While the above description constitutes the preferred embodiments of the present invention, it is to be appreciated that the invention is susceptible to modification, variation and change without departing from the proper scope and fair meaning of the accompanying claims.

What is claimed is:

1. A fishing lure comprising:
    hook means;
    a flexible strength bearing element having a pair of terminal ends;
    means for attachment of said hook means to said flexible strength bearing element at one of said pair of terminal ends;
    a body portion including a core member helically wound about said strength bearing element, said core member including a plurality of fibers extending radially therefrom for forming a minnow shaped lure body which has longer radially extending fibers at a portion between said terminal ends such that said body is widest at a portion between said terminal ends and has progressively shorter fibers toward each of said terminal ends for tapering toward each of said terminal ends; and
    means for providing attachment of said element to a fishing line.

2. The fishing lure of claim 1 wherein said core member has a degree of flexibility such that the core member can be flexed to various positions by human finger pressure and will remain in a set position when the lure travels through water.

3. The fishing lure of claim 1 wherein said core member is a pair of metal wires woven together.

4. The fishing lure of claim 1 wherein said core member is a straight wire element.

5. The fishing lure of claim 1 wherein said flexible strength bearing element is a coated wire leader.

6. The fishing lure of claim 1 wherein said fibers are polypropylene fibers.

7. The fishing lure of claim 1 wherein said fibers are aluminum.

8. The fishing lure of claim 1 wherein said core member is helically wound metal wires.

9. The fishing lure of claim 1 wherein said fibers are flattened such that they extend radially away from said core member substantially in one plane.

10. The fishing lure of claim 1 wherein one of said terminal ends is a snap swivel.

11. A fishing lure comprising:
    an elongated central flexible core element;
    an elongated body portion having a core member helically wound about said core element, said core member including a plurality of radially extending flexible fibers for forming said body portion, said body portion being formed in a three dimensional shape which is wider in the middle than at the ends of said elongated flexible core element for simulating a minnow shape body;
    means for attachment of said body portion to a fishing line;
    means for attachment of a hook to said core element, wherein said body portion is flexible and has memory characteristics due to said helically wound wire element such that the body portion can be formed in various shapes and retains these shapes while passing through water, but allowing the core element to be flexible enough to reduce the mechanical advantage of a fish trying to shake the lure, and said fibers being of a material which can be reformed by pressure to reform the body contour of the lure.

12. The fishing lure of claim 11 wherein said core member is a pair of woven metal wires.

13. The fishing lure of claim 11 wherein said core member is a pair of woven metal wires helically wound around a central flexible core element.

14. A fishing lure comprising:
    a flexible strength bearing element including a means on a first end thereof for attachment to a fishing line and a means on a second end thereof for attachment to a hook means;

a body portion including a core member helically wound about said strength bearing element;

a plurality of fibers extending radially from the core member to form a three dimensional shape which is widest in the middle and tapers to each end to simulate a minnow shape body; said core member being flexible and having memory characteristics such that the body can be formed in a desired shape and retain the shape during fishing thereof, but being flexible after a fish bites for reducing the mechanical advantage of a fish trying to shake the lure, and said fibers being of a material which can be formed by use of pressure to create a new body contour separate from that formed by bending the core member.

15. The fishing lure of claim 14 wherein said core member is a pair of woven metal wires.

16. A method of making a fising lure comprising the steps of:
 a) providing an elongated body portion including a strength bearing element having a core member helically wound about said core member, said core member including a plurality of fibers radially extending therefrom for forming a three dimensional body shape which is minnow like being wider at the center and narrowing at both ends, said central core member having memory characteristics such that it can be shaped and will retain its shape during fishing but is flexible to reduce the mechanical advantage of a fish when the fish is trying to shake the lure;
 b) attaching a fishing line receiving member at a first end of said core member; and
 c) attaching a fishing hook means to a second end of said core member.

17. A method of making a fishing lure comprising the steps of:
 a) providing a flexible strength bearing element;
 b) providing an elongated body portion including a central core member having a plurality of fibers radially extending therefrom for forming a three dimensional body shape which is minnow shaped being wider at the center and narrowing toward both ends, said central core member having memory characteristics such that it can be shaped and will retain its shape during fishing but is flexible to reduce the mechanical advantage of a fish when the fish is trying to shake the lure;
 c) attaching said body portion to said strength bearing element by helically winding said core member about said strength bearing element; and
 d) attaching a hook portion to an end of the strength bearing element, the other end of the strength bearing element provided with a means for attachment to a fishing line.

18. A method of making a fishing lure comprising the steps of:
 a) providing a flexible strength bearing element;
 b) providing an elongated body portion including a central core member having a plurality of fibers radially extending therefrom for forming a three dimensional body shape which is minnow shaped being wider at the center and narrowing toward both ends, said central core member having memory characteristics such that it can be shaped and will retain its shape during fishing but is flexible to reduce the mechanical advantage of a fish when the fish is trying to shake the lure;
 c) attaching said body portion to said strength bearing element by securing it at both ends and at the middle of said strength bearing element;
 d) attaching a hook portion to an end of the strength bearing element, the other end of the strength bearing element provided with a means for attachment to a fishing line.

19. The method of claim 17 further comprising the steps of: providing a second elongated body portion of the like configuration with said elongated body portion and attaching it to said strength bearing element by helically winding said second elongated body portion about said strength bearing element.

20. A method of making a fishing lure comprising the steps of:
 providing a first flexible core member having a loop portion at a first end of said first flexible core member;
 providing an elongated body portion having a second flexible core member including a plurality of fibers extending radially from said second core member, said fibers having lengths such that a middle portion and the ends of the second flexible core member have fibers of the shortest length and the length of the fibers continually increases from the middle portion and ends to positions intermediate the middle portion and the ends to form two elongated tapered portions;
 positioning the middle portion of the second core member within the loop portion at the first end of the first flexible core member; and twisting the two elongated tapered portions of the second core member around the first core member to form a single body having a minnow-like shape.

21. The method of claim 20 wherein the twisting step is accomplished by a motor.

22. The method of claim 20 wherein the two ends of the second core member is secured to a second end of the first core member.

23. A fishing lure comprising:
 hook means;
 a flexible strength bearing element having a pair of terminal ends;
 means for attachment of said hook means to said flexible strength bearing element at one of said pair of terminal ends;
 at least one body portion including a core member attached at a middle portion and at said terminal ends of said flexible strength bearing element, said core member including a plurality of fibers extending radially therefrom for forming a minnow shaped lure body which has longer radially extending fibers at a portion between said terminal ends such that said body is widest at a portion between said terminal ends and has progressively shorter fibers toward each of said terminal ends for tapering toward each of said terminal ends; and
 means for providing attachment of said core member to a fishing line.

24. The fishing lure of claim 23 further comprising a pair of said body portions including core members which are attached to said strength bearing element.

25. A fishing lure comprising:
 a flexible strength bearing element including a middle and a pair of ends;

at least one body portion including a core member comprising at least one wire element attached to said flexible strength bearing element at the middle and ends of the body portion, said core member including a plurality of radially extending flexible fibers for forming said body portion, said body portion being formed in a three dimensional shape which is wider in the middle than at the ends of said flexible strength bearing element for simulating a minnow shape body;

means for providing attachment to a fishing line;

means for providing attachment of a hook wherein said flexible strength bearing element is flexible and said core member has memory characteristics such that the body portion can be formed in various shapes and retains these shapes while passing through water, but allowing the element to be flexible enough to reduce the mechanical advantage of a fish trying to shake the lure, and said fibers being of a material which can be formed by use of pressure to reform the body contour of the lure into a new body contour separate from the shape formed by bending of the element.

26. The fishing lure of claim 25 wherein a pair of said wire elements are attached to said elongated central core element.

27. The fishing lure of claim 25 wherein different colored fibers extend from each of the pair of body portions.

28. A fishing lure comprising:

hook means;

a flexible straight strength bearing element having a pair of terminal ends;

means for attachment of said hook means to said flexible straight wire element at one of said pair of terminal ends;

means for providing attachment of said flexible straight wire element to a fishing line; and a body portion including element core helically wound about said straight wire element, said second wire element including a plurality of fibers extending radially from it for forming a minnow shaped lure body which has longer radially extending fibers at a portion between said terminal ends, such that said body is widest at a portion between said terminal ends and has progressively shorter fibers toward each of said terminal ends for tapering of the body shape toward each of said terminal ends.

29. The fishing lure of claim 23 wherein different colored fibers extend from each of the pair of body portions.

* * * * *

UNITED STATES PATENT AND TRADEMARK OFFICE
CERTIFICATE OF CORRECTION

PATENT NO. : 5,084,997
DATED : February 4, 1992
INVENTOR(S) : Frank A. DiPaola

It is certified that error appears in the above-indentified patent and that said Letters Patent is hereby corrected as shown below:

Column 2, Line 58, "ofthe" should be --of the--.

Column 3, Line 8, "cores" should be --core--.

Column 4, Line 15, "mor" should be --more--.

Column 4, Line 22, "alternatively" should be --Alternatively--.

Column 4, Line 45, "elements," should be --element,--.

Column 4, Line 58, "separated" should be --separate--.

Column 10, Line 1, Claim 27, "The" should be --A--.

Column 10, Line 13, Claim 28, after "including" insert --a second wire--.

Signed and Sealed this

Nineteenth Day of November, 1996

Attest:

BRUCE LEHMAN

Attesting Officer

Commissioner of Patents and Trademarks